United States Patent
Le et al.

(10) Patent No.: US 8,902,917 B2
(45) Date of Patent: Dec. 2, 2014

(54) METHOD FOR COORDINATION OF WIRELESS TRANSCEIVERS OF A NETWORK NODE AND NETWORK NODE

(75) Inventors: Long Le, Dossenheim (DE); Roberto Baldessari, Heidelberg (DE); Andreas Festag, Dossenheim (DE); Wenhui Zhang, Heidelberg (DE)

(73) Assignee: NEC Europe, Ltd., Heidelberg (DE)

( * ) Notice: Subject to any disclaimer, the term of this patent is extended or adjusted under 35 U.S.C. 154(b) by 190 days.

(21) Appl. No.: 13/322,999

(22) PCT Filed: May 29, 2009

(86) PCT No.: PCT/EP2009/003868
§ 371 (c)(1),
(2), (4) Date: Feb. 21, 2012

(87) PCT Pub. No.: WO2010/136053
PCT Pub. Date: Dec. 2, 2010

(65) Prior Publication Data
US 2012/0134342 A1    May 31, 2012

(51) Int. Cl.
*H04W 72/12* (2009.01)

(52) U.S. Cl.
CPC ...... *H04W 72/1252* (2013.01); *H04W 72/1247* (2013.01)
USPC ............................................. 370/435; 370/338

(58) Field of Classification Search
CPC .................... H04W 72/1247; H04W 72/1252; H04L 67/12
USPC ......................................... 370/338, 431, 445
See application file for complete search history.

(56) References Cited

U.S. PATENT DOCUMENTS

| 7,340,236 B2 | 3/2008 | Liang et al. |
| 2004/0022210 A1 | 2/2004 | Frank et al. |
| 2005/0170776 A1* | 8/2005 | Siorpaes ............... 455/41.2 |

(Continued)

FOREIGN PATENT DOCUMENTS

| EP | 1 388 951 | 2/2004 |
| EP | 1 392 024 | 2/2004 |

(Continued)

OTHER PUBLICATIONS

Japanese Office Action, dated Jan. 30, 2013, from corresponding JP application.

(Continued)

*Primary Examiner* — Paul H Masur
(74) *Attorney, Agent, or Firm* — Young & Thompson

(57) ABSTRACT

A method for coordination of wireless transceivers of a network node, in particular for application in communication nodes of a vehicular network, wherein the network node is equipped with one or more wireless transceivers that are capable of simultaneously generating and/or receiving electromagnetic signals on different electromagnetic channels, the electromagnetic signals being potentially able to interfere with each other, is characterized in the steps of, for each pending packet transmission on a particular of the electromagnetic channels, checking the presence of ongoing and/or scheduled activity on one or more of the other of the electromagnetic channels, and deferring the pending packet transmission in case ongoing and/or scheduled activity is detected on one or more of the other of the electromagnetic channels, at least until the detected ongoing and/or scheduled activity on one or more of the other of the electromagnetic channels is completed. Furthermore, a corresponding network node is disclosed.

19 Claims, 4 Drawing Sheets

(56) References Cited

U.S. PATENT DOCUMENTS

| | | |
|---|---|---|
| 2005/0215284 A1 | 9/2005 | Su et al. |
| 2005/0222716 A1 | 10/2005 | Tengler et al. |
| 2005/0286446 A1 | 12/2005 | Barber |
| 2007/0099567 A1 | 5/2007 | Chen et al. |
| 2008/0232339 A1 | 9/2008 | Yang et al. |
| 2010/0226291 A1* | 9/2010 | Gorbachov .................. 370/280 |

FOREIGN PATENT DOCUMENTS

| | | |
|---|---|---|
| EP | 1 583 295 | 10/2005 |
| JP | 2003500949 A | 1/2003 |
| JP | 2006521714 A | 9/2006 |
| JP | 2008541545 A | 11/2008 |
| WO | 0072608 A2 | 11/2000 |
| WO | 2004/045092 | 5/2004 |
| WO | 2004045092 A1 | 5/2004 |
| WO | 2006118427 A2 | 11/2006 |
| WO | 2009024950 A2 | 2/2009 |

OTHER PUBLICATIONS

International Search Report dated Mar. 17, 2010, corresponding to PCT/EP2009/003868.

* cited by examiner

METHOD FOR COORDINATION OF WIRELESS TRANSCEIVERS OF A NETWORK NODE AND NETWORK NODE

The present invention relates to a method for coordination of wireless transceivers of a network node, in particular for application in communication nodes of a vehicular network, wherein said network node is equipped with one or more wireless transmitters that are capable of simultaneously generating and/or receiving electromagnetic signals on different electromagnetic channels, said electromagnetic signals being potentially able to interfere with each other.

Furthermore, the present invention relates to a network node, in particular communication node of a vehicular network, including one or more wireless transceivers that are capable of simultaneously generating and/or receiving electromagnetic signals on different electromagnetic channels, said electromagnetic signals being potentially able to interfere with each other.

BACKGROUND OF THE INVENTION

In some communication networks it is common practice that network nodes are equipped with two or more wireless transceivers in order to facilitate communication over different electromagnetic channels. In these cases, interferences are very likely to occur between the different channels due to the physical vicinity of a node's different transmitters. This interference problem gets worse when the transceivers operate in electromagnetic channels that are rather close or even adjacent.

A scenario where the problems outlined above might occur is in vehicular ad hoc networks. Vehicular communication is considered a key technology for Intelligent Transport Systems (ITS) because it has the potential to increase road safety and traffic efficiency. For this purpose, the mature, inexpensive, and widely available 802.11 wireless LAN technology appears very attractive. In vehicular communication, vehicles are equipped with wireless transceivers and can spontaneously form an ad hoc network among them. Vehicles acting as network nodes can use the ad hoc network to communicate with each other in order to support safety applications such as cooperative collision warning.

Recognizing the potential of vehicular communication, the European Commission has recently allocated a 30-MHz frequency band (5875-5905 MHz) for safety-related communication of Intelligent Transport Systems (Commission Decision of Aug. 5, 2008 on the harmonized use of radio spectrum in the 5 875-5905 MHz frequency band for safety-related applications of ITS, 2008/671/EC). While the European Commission has not specified how this frequency band will be used, based on the current status of standardization activities in ETSI TC ITS (European Technical Standards Institute Technical Committee Intelligent Transport Systems), it is expected that this frequency band will be divided into one 10-MHz control channel (CCH) and two 10-MHz service channels (SCH1 and SCH2). An overview of the anticipated European channel allocation for safety-related communication is depicted in FIG. 1. Additional 10-MHz service channels in the same 5.8-5.9 GHz frequency band are expected to become available in Europe for other vehicular applications.

Further, as the automotive industry requires that a vehicle is constantly able to receive messages sent on the control channel, the most appropriate solution according to currently and short/mid-term available hardware consists of a dual transceiver communication system including two transceivers operating in this frequency band. One of these transceivers will operate in the control channel that is dedicated to the exchange of periodic messages and event-driven warning messages. The other transceiver will operate alternately on the service channels and will be used for other ITS-related communication purposes.

As can be observed in FIG. 1, CCH, SCH1, and SCH2 do not overlap. Thus, in theory, these channels are orthogonal, i.e., signals transmitted simultaneously on these channels do not interfere with each other. However, interference between these channels occurs because they are adjacent (SCH2-CCH, SCH1-SCH2) or near (SCH1-CCH). Interference occurs when, due to imperfect transmit spectrum mask, a signal transmitted on a channel can spill over into adjacent channels and interferes with signals on these channels. Other causes of interference are limitations of receivers' filters and problems due to the co-location of two transceivers in the same unit, like board crosstalk and radiation leakage. The consequences of interference include: (i) on the transmitter's side, adjacent and near channel interference induces spurious carrier sense for CSMA (Carrier Sense Multiple Access)-based wireless communication technologies; (ii) on the receiver's side, adjacent and near channel interference creates a variant of the hidden node problem since signals spill over into adjacent channels and impair each other's reception.

Several measurement studies indeed confirmed the problem of adjacent and near channel interference. In this respect it is exemplarily referred to Nachtigall et al., "The Impact of Adjacent Channel Interference in Multi-Radio Systems using IEEE 802.11", Proceedings of the International Wireless Communications and Mobile Computing Conference, August 2008 as well as to Angelakis et al., "Adjacent Channel Interference in 802.11a: Modeling and Testbed validation", IEEE Radio and Wireless Symposium (RWS 2008), Orlando, Fla., USA, January 2008. The studies have identified different interference scenarios in 802.11 networks, which are conveniently classified according to the source that generates interfering signals. The scenarios addressed by the present invention are those where simultaneous activities on multiple transceivers take place within the same note (i.e. "locally" interfering). In the TX-TX scenario, two simultaneous transmissions interfere with each other and thus limit the probability of correct reception on the receiver's end. In the TX-RX scenario, an ongoing reception is disturbed by an initiating transmission.

The vehicular draft version of 802.11 (IEEE P802.11p/D6.0—Draft Standard for Information Technology—Telecommunications and information exchange between systems—Local and metropolitan area networks—Specific requirements—Part 11: Wireless LAN Medium Access Control (MAC) and Physical Layer (PHY) specifications—Amendment 7: Wireless Access in Vehicular Environments) recognizes the problem of adjacent channel interference and introduces 4 classes of transceiver's spectrum mask, where the highest class D outperforms currently available hardware. The additional complexity required to achieve the class D spectrum mask is rather high and strongly impacts the final per-unit transceiver cost, representing a major concern for the automotive industry and therefore reducing the likelihood that class D transceivers will ever be deployed.

Various techniques have been proposed in other short-range wireless applications like mesh networks in order to limit the effects of adjacent channel interference, including the usage of directional antennas (e.g. in Cheng et al., "Adjacent Channel Interference in Dual-radio 802.11 Nodes and Its Impact on Multi-hop Networking", IEEE Global Telecommunications Conference (GLOBECOM 2006), November 2006) and the selective usage of channels with enough distance in frequency between them (e.g. in V. Raman, "Dealing with Adjacent Channel Interference Effects in Multichannel, Multi-interface Wireless Networks", Master's Thesis, University of Illinois at Urbana-Champaign, December 2008.). However, these techniques are not suitable for various scenarios and are in particular not applicable to vehicular communications where network nodes are not stationary and the only available channels are adjacent or near.

A related technique for improving the throughput of wireless access points equipped with multiple radios operating on different channels is described in US 2005/0286446 A1. The technique disclosed addresses a pathological scenario where a wireless access point first sends a unicast data frame to a client on a certain channel and then transmits a unicast data frame to another client on another channel shortly thereafter. In this case, the first client sends an acknowledgement to the wireless access point while the second transmission is still ongoing. Due to channel interference, the first client's acknowledgement cannot be received correctly by the wireless access point. This causes the wireless access point to do one or multiple retransmissions and delivers poor performance. The proposed technique solves this pathological scenario by synchronizing all radios of a wireless access point so that its transmissions on multiple channels begin and end at approximately the same time. This technique is not applicable for vehicular communication that operates in ad hoc mode and does not have an access point. Further, vehicular communication transmits safety-related messages in broadcast frames that do not have an acknowledgement mechanism.

US 2003/0147368 A1 describes another related method according to which the multiple transmitters co-located in the same station are alternatively toggled on/off. Switching on and off a transmitter implies that the transmitter being turned off will eventually drop the packets that are accumulating in its transmit queue. Furthermore, toggling the status of a transmitter introduces latency due to the time required by a transmitter to return to its active state.

The solution described in US 2008/0232339 A1 introduces a cross-technology activity check but only reacts to possibly interfering transmissions by rejecting one and counting the number of rejections as an indication based on which the activity of the other transmitter is reduced. This statistically allows both transmitters to have the chance to transmit without causing interference to each other, but does not enable packet re-scheduling with the minimum possible latency that still allows preventing interfering transmissions. The simple rejection implies high latencies and the statistical interference mitigation requires the reduction of activity on one transmitter in order to be effective. In particular for safety applications these performance characteristics are not acceptable.

It is therefore an object of the present invention to improve and further develop a method for coordination of wireless transceivers of a network node and a network node of the initially described type in such a way that, by employing mechanisms that are readily to implement, interferences caused by simultaneous transmissions of different transceivers are widely eliminated in a reliable and efficient way.

SUMMARY OF THE INVENTION

In accordance with the invention, the aforementioned object is accomplished by a method comprising the steps of
  for each pending packet transmission on a particular of said electromagnetic channels, checking the presence of ongoing and/or scheduled activity on one or more of the other of said electromagnetic channels, and
  deferring said pending packet transmission in case ongoing and/or scheduled activity is detected on one or more of the other of said electromagnetic channels, at least until said detected ongoing and/or scheduled activity on one or more of the other of said electromagnetic channels is completed.

Furthermore, the aforementioned object is accomplished by a network node comprising the features of independent claim 15. According to this claim, such a network node is characterized in that said wireless transceivers include detection means that check for each pending packet transmission on a particular of said electromagnetic channels the presence of ongoing and/or scheduled activity on one or more of the other of said electromagnetic channels, wherein said wireless transceivers are configured to defer said pending packet transmission in case ongoing and/or scheduled activity is detected on one or more of the other of said electromagnetic channels, at least until said detected ongoing and/or scheduled activity on one or more of the other of said electromagnetic channels is completed.

According to the invention it has first been recognized that interferences caused by simultaneous transmissions by the same network node on adjacent or near channels can be efficiently avoided by preventing potentially overlapping locally-generated packet transmissions. To this end the present invention proposes for each pending packet transmission on a particular electromagnetic channel to check the presence of ongoing and/or scheduled activity on all other channels. The method according to the invention exploits the interaction between the physical layer and the MAC layer to wait for the completion of a frame transmission on a channel before transmitting another frame on a different channel or to wait for the completion of an incoming packet before transmitting another frame on an interfering channel. In this regard the invention takes advantage of the fact that information exchange between different transceivers of a network node is possible as the transceivers' drivers are under control of the same operating system.

In case that for a pending packet transmission via a specific electromagnetic channel ongoing and/or scheduled activities are detected on any other channel, the present invention provides a deferring mechanism that introduces a postponement of the respective packet transmission. In this way a specific scheduling of packet transmissions by the network node on different electromagnetic channels is achieved that can be described as a pipelined transmission with packet-level granularity. As a result, an elimination of simultaneous interfering activities by the same network node on different electromagnetic channels is achieved and the probability of reception of messages transmitted and/or received by a station equipped with the deferring mechanism is significantly increased.

As a further advantage of the present invention it is to be noted that the proposed mechanism is totally self-configuring with no static system parameters to be chosen a priori, which would be susceptible of poor performance in dynamic network environments, for instance when being applied in vehicular ad hoc networks). Furthermore, the proposed mechanism runs and applies entirely locally, i.e. it does not require any interaction with other nodes, which would be not reliable in dynamic environments. In particular, waiting for acknowledgments or other signaling messages is not required.

More in detail, the method in accordance with the present invention prevents simultaneous transmissions from taking place by two interfering transceivers tuned to adjacent or near channels and located in the same station. While a transmission is taking place on one channel, transmissions on other inferring channels are deferred until the packet that is being currently transmitted is completed. The same policy can be applied to defer packet transmissions that would interfere with ongoing packet receptions on an adjacent or near channel. As a consequence, the two transceivers are pipelined, i.e. operate alternatively and not simultaneously. It should be noted that the two receivers can still receive simultaneously, as only the transmission path is modified (but based on the status of both the transmission and reception path).

According to a preferred embodiment pending packet transmissions on a particular electromagnetic channel are carried out as soon as a detected ongoing and/or scheduled activity on one or more of the other electromagnetic channels is completed. By this means the performance in terms of latency is maximized. In other words, the interleaved scheduling of packets on different transceivers with the lowest possible latency is assured.

According to a specific embodiment the network node may be equipped with multiple wireless LAN transceivers based on the IEEE 802.11 standard family. In such case the deferring mechanism may be realized by postponing the passing down of packets from the network layer or a generic upper layer to the MAC layer, i.e. the deferring mechanism may be applied before the MAC layer access contention is performed. As soon as the ongoing activity on other transceivers is completed, the transceiver may start the MAC layer access contention to issue the pending packet.

With respect to a further reduction of the packet delivery latency, it may be provided that a deferring of a pending packet transmission is realized by postponing the packet transmission after the MAC layer access contention. In other words, the deferring mechanism is applied after the MAC layer access contention is performed, i.e. the MAC layer completes the MAC procedures necessary to gain the rights to transmit beforehand. If the ongoing activity on the other transceivers is completed while performing the MAC contention, the transceiver can issue the packet as soon as the transceiver has gained the right to transmit, resulting in rather low packet delivery latency. Instead, if the ongoing activity on the other transceivers has not been completed, the transmission is deferred, e.g. in the same transmission opportunity (TXOP) assuming it is long enough to contain the deferring interval and the transmission.

In a specific embodiment it may be provided that the checking for ongoing and/or scheduled activity solely includes checking the presence of any transmissions on other electromagnetic channels. However, with respect to a comprehensive coordination it is preferable that the ongoing and/or scheduled activity that is being checked includes the presence of both transmissions and receptions on all the interfering channels. In this embodiment, when a packet is to be sent on one channel, also the presence of ongoing receptions on the other channels is checked. This embodiment allows the network node to correctly receive a packet without being disturbed by the starting of a pending transmission, i.e. self-generated interference to ongoing packet receptions is reduced.

Advantageously, the network node is an on-board unit for vehicular communication that is equipped with two or more transceivers, which may be temporarily or permanently tuned to adjacent or near electromagnetic channels. At least two of the transceivers may be tuned to different electromagnetic channels in the same frequency band. In particular, it may be provided that at least two of the transceivers are tuned to different electromagnetic channels in the frequency band allocated by the European Commission of Intelligent Transport System (ITS) applications, belonging to the frequency range 5.855-5.925 GHz. Furthermore it may be provided that at least one of the transceivers is tuned to the Control Channel as defined by the ETSI TC ITS specifications, and wherein at least one other transceiver is tuned to one of the service channels as defined by the ETSI TC ITS specifications.

Optionally, the network node comprises a single wideband transmitter that is capable of simultaneously transmitting two or more signals on two or more different electromagnetic channels, preferably in the frequency range 5.855-5.925 GHz. In this case the present invention applies to the simultaneous and interfering electromagnetic signals generated by the single wide-band transmitter, which is expected to provide the same type of notification upon the completion of a packet transmission. Similarly, a further embodiment of the present invention consists in the above coordination mechanism applied to a single wide-band receiver coupled with multiple transmitters or a single wide-band transmitter.

According to a preferred embodiment at least two of the transceivers may share a single antenna which is made possible at the MAC layer by the present invention since the transmissions/receptions are pipelined and do not overlap. The present invention does not cover the physical layer issues that, at the current state-of-the-art, may not allow for antenna sharing among transceivers (e.g. spurious signals from synthesizers might disturb the simultaneous receptions on two receivers etc.). However, by preventing overlapping transmissions and overlapping transmission/reception operations on different channels, the present invention provides the scheduling of operations supporting antenna sharing down to the MAC and part of the PHY layer. Hence, network nodes like e.g. on-board units for vehicular communication with multiple transceivers can be produced and operated in a more cost efficient way.

In a specific embodiment the electromagnetic channels may include at least one channel with high priority and at least one channel with low priority. For instance, the high priority channel may be the Control Channel as defined by the ETSI TC ITS specifications mentioned above, and the at least one low-priority channel may be either the Service Channel 1 or the Service Channel 2 as defined by the ETSI TC ITS specifications mentioned above. Advantageously, pending packet transmissions via the at least one low-priority channel are deferred until transmission of all packets waiting to be sent via the at least one high-priority channel is completed. By this means a prioritization of packet transmission across multiple transceivers in the same network node is provided, thereby increasing the reception probability and the delivery performance of critical messages over less-important messages which would not be achievable with per-transmitter MAC-layer prioritization.

Depending on the specific application scenario the prioritization may be even enhanced by deferring pending packet transmissions via a low-priority channel until transmission of all packets newly arriving for the at least one high-priority channel during active transmission via that channel is completed. With respect to a still further enhancement of prioritization it may be provided that packet transmission on low-priority channels is restricted in that after each single packet transmission completion, the packet transmissions pending for the low-priority channels yield those pending for the high-priority channels, which limits the waiting time for pending packets on the high-priority channels. As an additional benefit, channel load on low-priority channels is automatically adapted according to the load on the high-priority channels, resulting in less adjacent channel interference for the high-priority channels.

With regard to the activity checking mechanism it may be provided that the completion of detected ongoing and/or scheduled activity triggers the provision of a respective inter-channel notification by the physical layer. For instance, it may be provided that the network node is configured to maintain counters to keep track of ongoing and pending transmissions at the physical layer on each of the different electromagnetic channels. Such counter for an electromagnetic channel may be incremented when a packet is passed down to the physical layer for transmission on that channel. On the other hand the counter may be decremented when the transmission of a packet on that electromagnetic channel is completed, upon which the transmitter hardware typically notifies the software driver with an interrupt. Alternatively or additionally, a shared data structure may be provided in which each of the different electromagnetic channels has a status entry. In a specific embodiment such transmitter's status may be represented by the above-mentioned counter, or specific parameters like "busy" (indicating an ongoing and/or scheduled activity) and "free" or "idle" (indicating that there is no current activity) may be employed.

BRIEF DESCRIPTION OF THE DRAWINGS

There are several ways how to design and further develop the teaching of the present invention in an advantageous way. To this end, it is to be referred to the patent claims subordinate to patent claims 1 and 15 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings

DETAILED DESCRIPTION OF THE PREFERRED EMBODIMENTS

Figure 1:
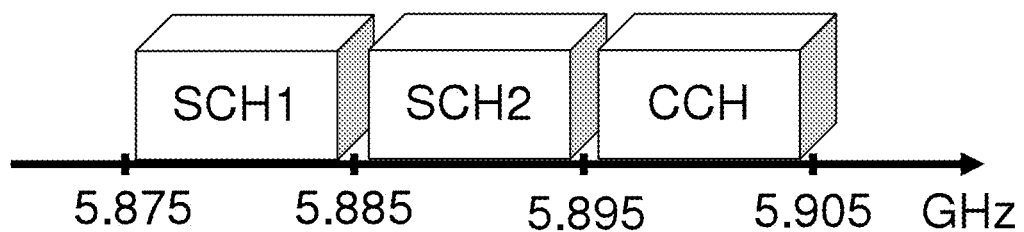
FIG. 1 illustrates schematically the frequency allocation of the European Commission for safety-related communication and its channelization as specified by ETSI TC ITS.
Figure 2:
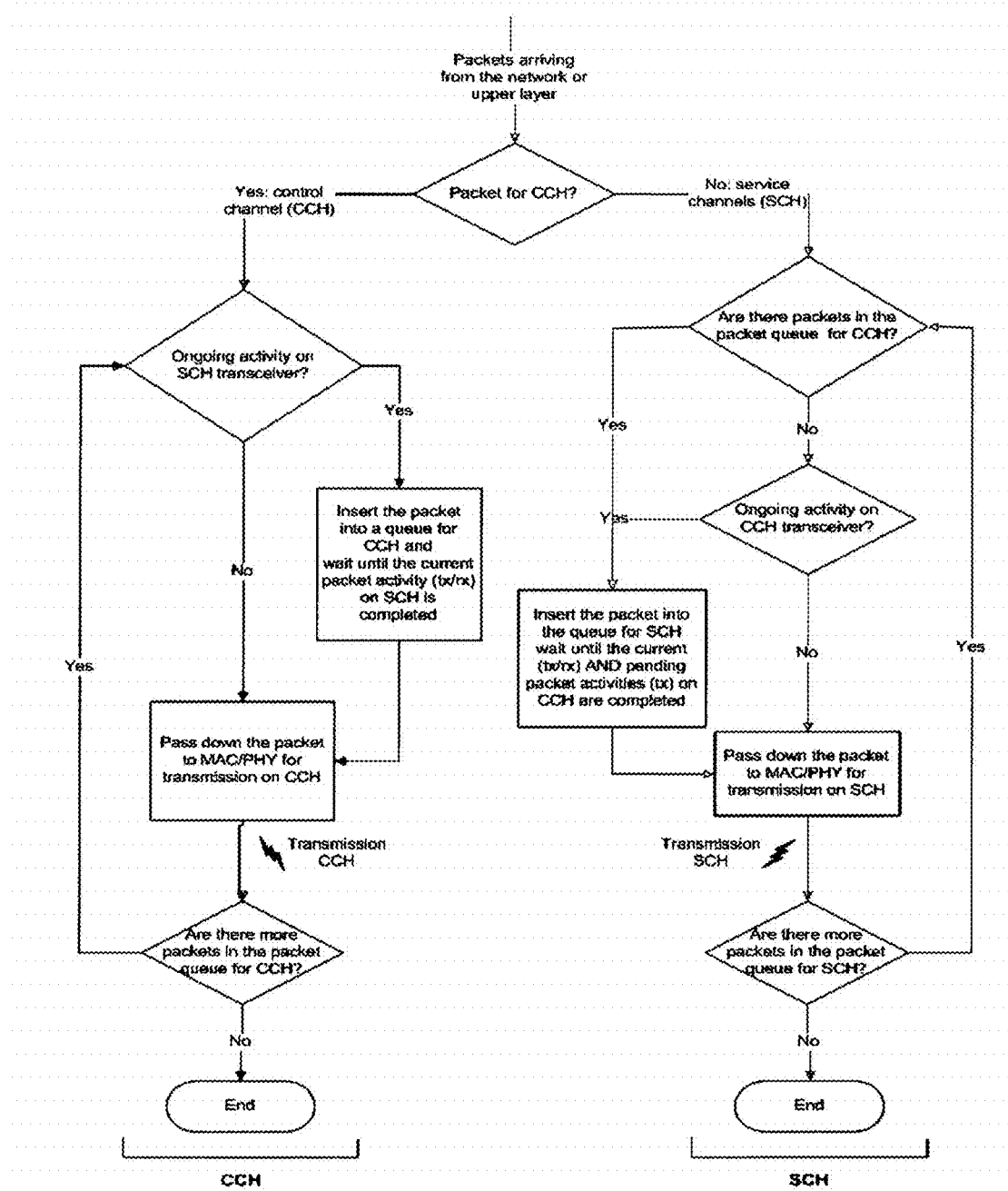
FIG. 2 illustrates a flow chart for coordination of local interfering transceivers in accordance with one embodiment of the present invention.

Referring to FIG. 2, an exemplary flow chart is depicted illustrating a method for coordination of local interfering transceivers which is operative in a manner consistent with the present invention. In the given example it is assumed that the network layer (or a generic upper layer) decides on which channel a packet is to be transmitted. For the sake of simplicity, in FIG. 2 a total of only two transceivers are adopted although it is understood that the described method applies for coordination of more than two transceivers in a similar way. Although not explicitly shown, the transceivers operate in the frequency band 5875-5905 MHz illustrated in FIG. 1, which the European Commission as well as the Federal Communications Commission (FCC) of the United States of America have recently allocated for safety-related communication of Intelligent Transport Systems (ITS). In the example of FIG. 2 it is assumed that one of the transceivers is used for a dedicated Control Channel (5895-5905 MHz) and the other transceiver for dedicated Service Channels (5875-5885 MHz and 5885-5895 MHz, respectively).

In the illustrated case it is assumed that the channels are assigned to applications with different priorities (e.g. safety vs non-safety). Therefore, the policy for deferring packet transmissions is asymmetrical. An example of asymmetrical policy is as follows: packets to be sent on the channel dedicated to higher priority messages are deferred only by the time required to complete the single packet that is being transmitted on a low-priority channel. Instead, packets to be sent on the lower priority channel are deferred until all the pending packet transmissions on the high-priority channel are completed (in other words the low-priority transceiver yields the high-priority transceiver). This asymmetry provides an enhanced prioritization of messages across different channels that is amplified by the increased probability of reception provided by the coordinated packet transmission in a pipelined fashion and which is thus more effective as compared to single-channel prioritization techniques. As a result of the prioritization, the load on the low-priority channel is automatically adapted, resulting in less interference caused by the local stations' packets transmitted on the low-priority channel to ongoing transmissions by other nodes, which are outside the coordination scope.

Turning back to the details of FIG. 2, when a packet is passed down from the network layer (or a generic upper layer), first a channel for transmission is selected which is then conveyed to the MAC layer. More specifically, it is checked whether the packet is intended for the Control Channel CCH. If so, before delivering the packet to the (hardware) transmit queue for the Control Channel CCH, where the medium access scheme for transmission is executed, the presence of ongoing activities on the Service Channel SCH is checked. If a packet transmission or reception is ongoing on the Services Channel SCH, the packet delivery to the transmit queue for the Control Channel CCH is deferred until the ongoing packet transmission/reception on the Service Channel SCH is completed. As soon as the Control Channel CCH is aware of the completion of the activity on the Service Channel SCH, the packet is passed down to the MAC layer or physical layer respectively for transmission via the Control Channel CCH. In case there are more packets in the packet queue for the Control Channel CCH, the process starts again by checking ongoing activity on the Service Channel SCH transceiver. Otherwise, no further steps are carried out.

On the other hand, in case the packet is intended for transmission via the Service Channel SCH, an asymmetry in the flow chart is introduced, which guarantees higher priority for the messages to be transmitted on the Control Channel CCH. More specifically, before checking for ongoing activity on the Control Channel CCH transceiver, it is checked whether there are any packets in the packet queue for the Control Channel CCH. If so, the pending packet is inserted into the queue for the Service Channel SCH and the transmission is deferred. Only if both current packet activities (transmission/reception) and pending packet activities (transmission) on the Control Channel CCH are completed, the packet is passed down to the MAC layer or the physical layer, respectively, for transmission via the Service Channel SCH.

Figure 3:
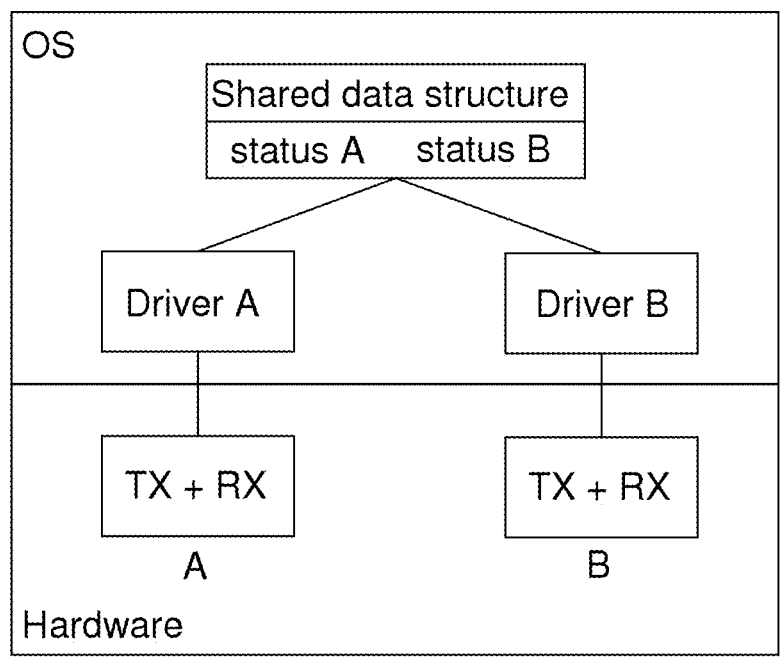
FIG. 3 is a schematic of a network node equipped with two transceivers

FIG. 3 is a schematic of a network node equipped with two transceivers the operation of which has been described in connection with FIG. 2. The transceiver TX+RX operating in the Control Channel CCH is denoted A, and the transceiver TX+RX operating in the Service Channel SCH is denoted B.

Both transceivers A, B are controlled by a driver, driver A and driver B respectively, which may be two runtime instances of the same software (e.g. when the two transceivers have similar or identical hardware). As can be obtained from FIG. 3, both transceivers A, B are operated under control of the same Operating System OS. Thus, it is possible that both transceiver drivers A, B share a common data structure in which their status with respect to ongoing and/or scheduled activity is maintained. Consequently, by accessing the shared data structure transceiver driver A is enabled to attain information about the current status of transceiver driver B, and vice versa.

Figure 4:
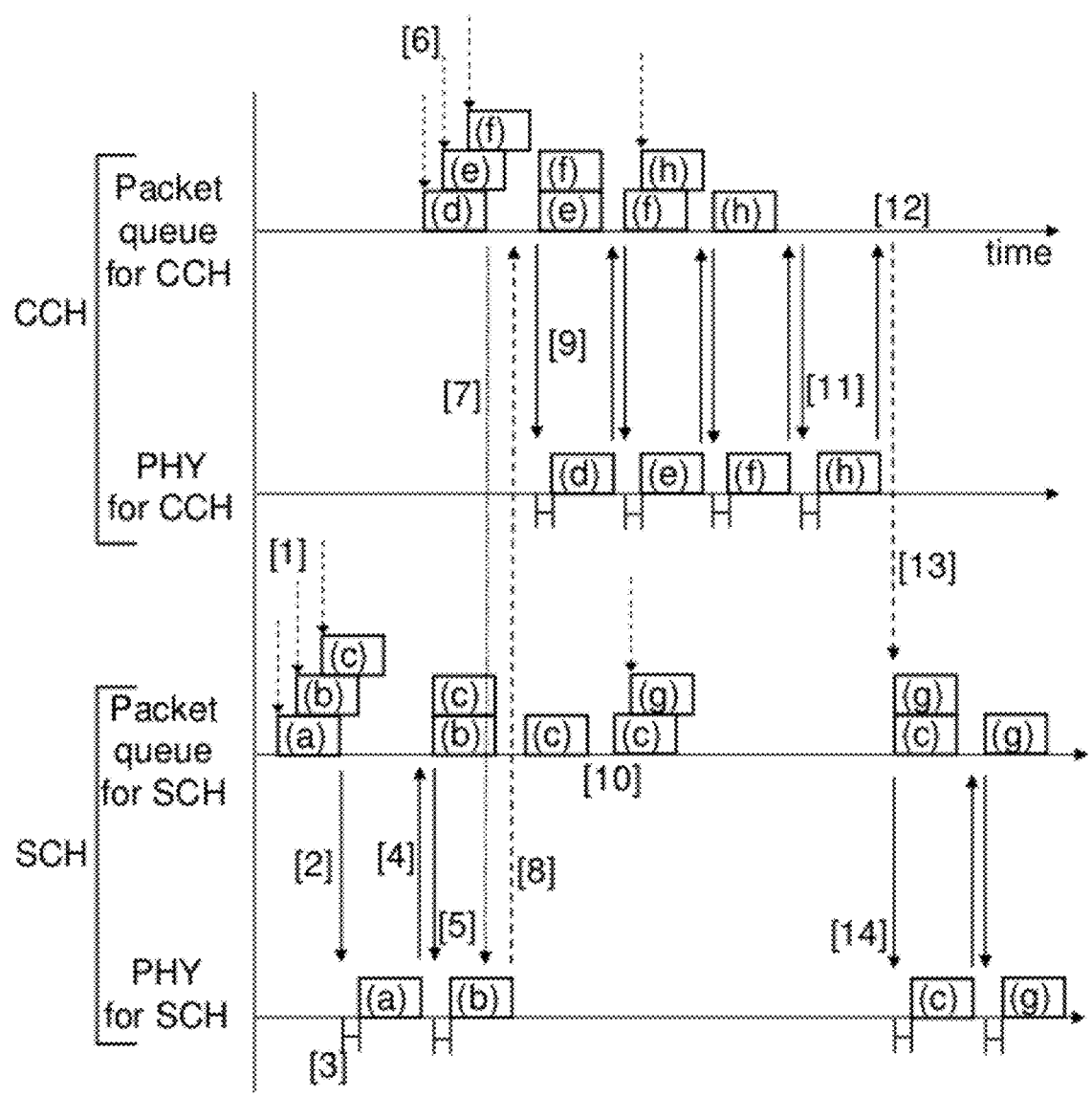
FIG. 4 is a diagram illustrating the method in accordance with the present invention in a specific embodiment for preventing interfering transmissions.

Another specific embodiment of the present invention, depicted in FIG. 4, consists of the coordination of transceivers solely based on the presence of ongoing transmissions. The embodiment relates to an onboard-unit of a vehicular node equipped with two transceivers. Two software packet queues are maintained, one for the Control Channel CCH and one for the Service Channels SCH. These queues are used to temporarily store packets before these packets are given to the transmit queue at the MAC layer for the medium access and transmission when there are ongoing or pending transmissions on one of the other channels.

In this embodiment the vehicular node maintains two counters to keep track of ongoing and pending transmissions at the physical layer PHY on the Control Channel CCH and Service Channels SCH. The counter for a channel is incremented when a packet is passed down to the physical layer for transmission on that channel. When the transmission of a packet on a channel is completed, a notification is provided by the physical layer and the counter for the corresponding channel is decremented accordingly. The counters may be maintained in a shared data structure as described in connection with FIG. 3.

When a packet is to be transmitted on the Control Channel CCH, the node checks whether there is any ongoing transmission on one of the Service Channels SCH at the physical channel, i.e., whether the counter for the Service Channels SCH is 0. If there is no ongoing transmission on the Service Channels SCH, the packet is passed down to the physical layer for transmission on the Control Channel CCH and the counter for the Control Channel CCH is incremented. Otherwise, the packet is kept in the packet queue for the Control Channel CCH until the counter for the Service Channels SCH reaches 0 (this counter is decremented when a physical layer PHY completes a transmission on the Service Channels SCH). At this point, packets from the queue for Control Channel CCH are given to the physical layer PHY for transmission.

When the present coordination mechanism receives a packet to be transmitted on one of the Service Channels SCH, it checks whether there are any ongoing or pending transmissions on any channel, i.e., whether the packet queue for the Control Channel CCH is empty and both counters for the Control Channel CCH and the Service Channels SCH are 0. If there are no ongoing or pending transmissions on any channel, the packet is passed down to the physical layer PHY for transmission on one of the Service Channels SCH. Otherwise, the packet is kept in the packet queue for the Service Channels SCH until the packet queue for the Control Channel CCH becomes empty and both counters for the Control Channel CCH and the Service Channels SCH reach 0 (the counter for a channel is decremented when a physical layer PHY completes a transmission on that channel).

It is noted that the described coordination mechanism offers priority support for the Control Channel CCH by only starting a packet transmission on a Service Channel SCH when the packet queue for the Control Channel CCH is empty and there is no ongoing transmission on any channel. Further, packet transmission on the Service Channels SCH at the physical layer PHY is restricted in that after each single packet transmission completion, the packet transmissions pending for the low-priority channels yield those pending for the high-priority channels, which limits the waiting time for pending packets on the Control Channel CCH. As an additional benefit, channel load on low-priority Service Channels SCH is automatically adapted, resulting in less adjacent channel interference for the high-priority Control Channel CCH.

In the following the coordination process illustrated in FIG. 4 is described in more detail. In step [1] packets (a), (b) and (c) are arriving from an upper layer for the Service Channel SCH. In a next step the first arriving packet (a) is passed to the physical layer PHY of the Service Channel SCH [2]. In [3], channel access contention is performed and after a specific contention period packet (a) is transmitted via the Service Channel SCH. In [4] the physical layer PHY notifies the upper layer of the completed transmission, and in [5] the same process is carried out for the next pending packet, which is packet (b).

In the meantime, packets (d), (e) and (f) have arrived from upper layers for the Control Channel CCH, which is indicated in [6]. However, before passing packet (d) to the physical layer PHY for transmission via the Control Channel CCH the transmitter in [7] checks for ongoing activities on the Service Channel and detects that a transmission of packet (b) is currently ongoing (dotted line). Consequently, the passing down of packet (d) to the physical layer PHY is deferred until a PHY notification (indicated by the dashed line in [8]) is received from the Service Channel SCH that the packet transmission of packet (b) is completed. Upon that notification, in [9] packets (d), (e), (f) are subsequently passed to the physical layer PHY and transmitted via the Control Channel CCH.

At the same time, due to the prioritization of the Control Channel CCH, the Service Channel SCH is locked [10], i.e. pending packet (c) and newly arriving (g) are kept in the packet queue of the Service Channel SCH. Due to the prioritization of the Control Channel CCH, even newly arriving packet (h) is transmitted via the Control Channel CCH [11], while the Service Channel SCH is still locked. In [12] the transmission of the Control Channel CCH is done and there are no more packets in the packet queue for the Control Channel CCH. In [13] the Service Channel SCH is notified accordingly, and the Service Channel SCH finally resumes with the transmissions of packets (c) and (g) [14].

Figure 5:
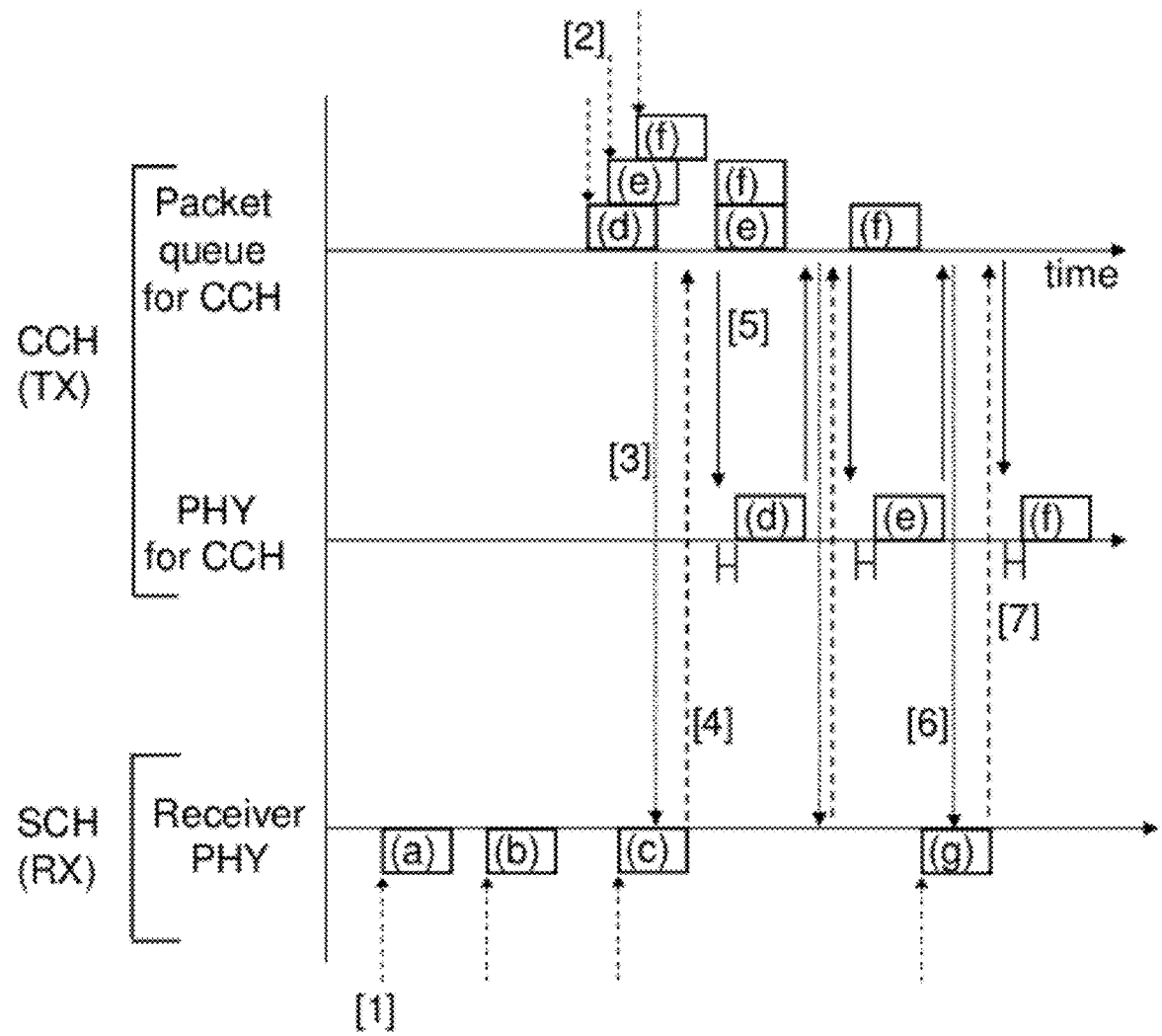
FIG. 5 is a diagram illustrating the method in accordance with the present invention in a specific embodiment for preventing an ongoing reception from being disturbed by a local transmission.

Another embodiment of the present invention is depicted in FIG. 5. In this embodiment, when a packet is to be sent on one channel, the presence of an ongoing reception on the other channel is checked. If a packet reception is currently taking place, the pending transmission is deferred until the reception of the current packet is completed. This embodiment allows a station to correctly receive the packet that is being received. In fact, starting a pending transmission while a packet is being received on another receiver (other channel or other technology that suffer from interference) can likely cause errors in the received packet.

In the following, the coordination process illustrated in FIG. 5 is described in more detail. In step [1], packets (a), (b) and (c) are received on the Service Channel SCH. During the reception of packet (c), in [2] packets (d), (e), (f) arrive from an upper layer for the Control Channel CCH. However, the transmission of these packets is deferred and they are kept in the packet queue, as in [3] the Control Channel CCH detects the ongoing packet reception (of packet (c)). The checking procedure is again indicated by the dotted line. Upon completion of the reception of packet (c) the Service Channel SCH informs the Control Channel CCH accordingly by sending an O.K. indicated by the dashed line in [4]. Upon receiving the notification, the Control Channel CCH starts transmitting the pending packets one after another [5]. After each transmission, the Control Channel CCH checks again for ongoing receptions on the Service Channel SCH. In [6], an ongoing reception (of packet (g)) is detected and the transmission of packet (f) is deferred until the reception of packet (g) is completed [7]. As it can be observed, packet (g) and (e) partially overlap. This is due to the fact that in FIG. 5 it is assumed that packet (g) transmission is out of the present node's control. In the case that the present invention is adopted by the originator of packet (g) and provided that the originator of packet (g) is able to receive packet (e), the overlapping does not take place in accordance to the coordination mechanism explained above.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for coordination of wireless transceivers of a network node, wherein said network node is equipped with one or more wireless transceivers that are capable of simultaneously generating and/or receiving electromagnetic signals on different electromagnetic channels, comprising the steps of:
    for each pending packet transmission on a particular of said electromagnetic channels, checking the presence of ongoing and/or scheduled activity on one or more of the other of said electromagnetic channels; and
    deferring said pending packet transmission in case ongoing and/or scheduled activity is detected on one or more of the other of said electromagnetic channels, at least until said detected ongoing and/or scheduled activity on one or more of the other of said electromagnetic channels is completed,
    wherein a scheduling of packet transmissions on said electromagnetic channels is realized with packet-level granularity by applying the deferring step before the packet has reached the physical layer, either at the Medium Access Control (MAC) layer or at a layer above the MAC layer, and
    wherein said deferring of a pending packet transmission is applied after the MAC layer access contention is completed and said network node has acquired the right to transmit.

2. The method according to claim 1, wherein said pending packet transmission on a particular of said electromagnetic channels is carried out as soon as said detected ongoing and/or scheduled activity on one or more of the other of said electromagnetic channels is completed.

3. The method according to claim 2,
    wherein said deferring of a pending packet transmission is realized by deferring the passing down of said packet from the network layer or a generic upper layer to the MAC layer, and/or
    wherein said deferring of a pending packet transmission and said packet transmission are both carried out in the same transmission opportunity obtained by said network node.

4. The method according to claim 2,
    wherein said checking of ongoing and/or scheduled activity is restricted to checking the presence of any transmissions on one or more of the other of said electromagnetic channels, or
    wherein said ongoing and/or scheduled activity that is checked includes the presence of transmissions and receptions on one or more of the other of said electromagnetic channels.

5. The method according to claim 1,
    wherein said deferring of a pending packet transmission is realized by deferring the passing down of said packet from the network layer or a generic upper layer to the MAC layer, and/or
    wherein said deferring of a pending packet transmission and said packet transmission are both carried out in the same transmission opportunity obtained by said network node.

6. The method according to claim 1,
    wherein said checking of ongoing and/or scheduled activity is restricted to checking the presence of any transmissions on one or more of the other of said electromagnetic channels, or
    wherein said ongoing and/or scheduled activity that is checked includes the presence of transmissions and receptions on one or more of the other of said electromagnetic channels.

7. The method according to claim 1,
    wherein said electromagnetic channels include at least one channel with high priority and at least one channel with low priority, and wherein pending packet transmissions via said at least one low-priority channel are deferred until transmission of all packets waiting to be sent via said at least one high-priority channel is completed,
    wherein pending packet transmissions via said at least one low-priority channel may be deferred until transmission of all packets newly arriving for said at least one high-priority channel during active transmission via that channel is completed, and/or
    wherein transmissions via said at least one low-priority channel may be restricted in that after each single packet transmission completion, the packet transmissions pending for the low-priority channels yield those pending for the high-priority channels.

8. The method according to claim 1, wherein said electromagnetic channels contain at least one control channel and one service channel, and the transmission and/or reception of said control channel is prioritized to the transmission and/or reception of said service channel.

9. The method according to claim 1, wherein said electromagnetic channels contain at least one channel allocated for safety-related communication and another channel allocated for non-safety-related communication, and the transmission and/or reception of said channel allocated for safety-related communication is prioritized to the transmission and/or reception of said channel allocated for non-safety-related communication.

10. The method according to claim 1, wherein the completion of said detected ongoing and/or scheduled activity triggers the provision of a respective inter-channel notification by the physical layer.

11. The method according to claim 1,
wherein said network node is configured to maintain counters to keep track of ongoing and pending transmissions at the physical layer on each of said different electromagnetic channels, and
wherein said counter for an electromagnetic channel may be incremented when a packet is passed down to the physical layer for transmission on that electromagnetic channel, and wherein said counter may be decremented when the transmission of a packet on that electromagnetic channel is completed.

12. The method according to claim 1, wherein a shared data structure is provided in which each of said different electromagnetic channels has a status entry.

13. A network node, comprising:
one or more wireless transceivers that are capable of simultaneously generating and/or receiving electromagnetic signals on different electromagnetic channels,
wherein said wireless transceivers include detection means that check for each pending packet transmission on a particular one of said electromagnetic channels, the presence of ongoing and/or scheduled activity on one or more other of said electromagnetic channels,
wherein said wireless transceivers are configured to defer said pending packet transmission in case ongoing and/or scheduled activity is detected on the one or more of the other of said electromagnetic channels, at least until the completion of said detected ongoing and/or scheduled activity on the one or more of the other of said electromagnetic channels is completed,
wherein a scheduling of packet transmissions on said electromagnetic channels is realized with packet-level granularity by deferring packet transmission before the packet has reached the physical layer, either at the Medium Access Control (MAC) layer or at a layer above the MAC layer, and
wherein said pending packet transmission is deferred by deferring said pending packet transmission after the MAC layer access contention is completed and said network node has acquired the right to transmit.

14. The network node according to claim 13, wherein said transceivers include multiple wireless LAN (local area network) transmitters, in particular based on the IEEE 802.11 standard family.

15. The network node according to claim 14, further comprising:
a single wide-band transmitter that is capable of simultaneously transmitting two or more signals on two or more different electromagnetic channels.

16. The network node according to claim 14, further comprising:
an on-board unit for vehicular communication that is equipped with two or more transceivers,
wherein said two or more transceivers may be temporarily or permanently tuned to adjacent or near electromagnetic channels, and/or
wherein at least two of said transceivers may be tuned to different electromagnetic channels in the same frequency band, and/or
wherein at least two of said transceivers may share a single antenna.

17. The network node according to claim 13, further comprising:
a single wide-band transmitter that is capable of simultaneously transmitting two or more signals on two or more different electromagnetic channels.

18. The network node according to claim 13, further comprising:
an on-board unit for vehicular communication that is equipped with two or more transceivers,
wherein said two or more transceivers may be temporarily or permanently tuned to adjacent or near electromagnetic channels, and/or
wherein at least two of said transceivers may be tuned to different electromagnetic channels in the same frequency band, and/or
wherein at least two of said transceivers may share a single antenna.

19. The network node according to claim 17,
wherein one or more of said transceivers are tuned to two different electromagnetic channels in the frequency band allocated by the European Commission for Intelligent Transport System (ITS) applications or allocated by the Federal Communications Commission (FCC) of the United States of America, belonging to the frequency range 5.855-5.925 GHz,
wherein at least one of said transceivers may be tuned to the Control Channel as defined by the ETSI TC ITS specifications, and wherein at least one of said transceivers may be tuned to one of the Service Channels as defined by the ETSI TC ITS specifications.

* * * * *